United States Patent [19]

Chappell

[11] 4,359,004
[45] Nov. 16, 1982

[54] CAR SEAT TABLES

[76] Inventor: Austin Chappell, 739 E. 1st South, Kaysville, Utah 84037

[21] Appl. No.: 295,789

[22] Filed: Aug. 24, 1981

Related U.S. Application Data

[63] Continuation-in-part of Ser. No. 183,024, Sep. 2, 1980, Pat. No. 4,341,418.

[51] Int. Cl.³ .............................................. A47B 23/00
[52] U.S. Cl. ..................................... 108/44; 108/112; 297/174; 297/188
[58] Field of Search ...................... 108/44, 45, 46, 112; 224/275, 42.11, 273, 277; 312/235 A; 5/507, 503; 297/162, 192, 188, 174

[56] References Cited

U.S. PATENT DOCUMENTS

| | | | |
|---|---|---|---|
| 1,723,238 | 8/1929 | Hoot | 108/44 |
| 2,650,374 | 9/1953 | Pierce | 108/44 X |
| 2,934,391 | 4/1960 | Bohnett | 312/235 A |
| 3,061,394 | 10/1962 | Whetstone | 312/235 A |
| 3,063,064 | 11/1962 | Mace | 108/44 X |
| 3,345,118 | 10/1967 | Cummings | 108/44 X |
| 3,592,144 | 7/1971 | Futrell | 108/44 |
| 3,804,233 | 4/1974 | Gregg, Jr. | 224/42.11 X |
| 3,949,917 | 4/1976 | Mann | 224/275 |
| 4,168,023 | 9/1979 | Osborn | 108/44 X |
| 4,174,669 | 11/1979 | Lalonde | 108/44 |

FOREIGN PATENT DOCUMENTS 2647511  4/1978  Fed. Rep. of Germany ........ 108/44

Primary Examiner—James T. McCall
Attorney, Agent, or Firm—Thorpe, North & Western

[57] ABSTRACT

Foldable car seat tables are disclosed. One embodiment is a hide-a-way model capable of being stored and removed from under a car seat. Another embodiment is capable of being removably installed without the use of penetrating fastening devices, such as screws, bolts, rivets, or the like. The table unit of either embodiment consists of multi-sections divided from one another by hinges. In the hide-a-way version, the table is held in an upsidedown storage position by guide runners which are centrally positioned in alignment on each table section and which slides along a track mounted on the bottom of the car seat for storage. To erect the table for use, the first or tray section, pulls out and bends up at a hinge, followed by the second section which is divided into a riser and cup portion. The second section is folded to a vertical position causing the tray section to become horizontally extended over the car seat. The riser is connected to a third section which remains on the track and the cup section is rotated to and supported in a forwardly extending portion in the same plane as the tray section. In the removable version, a front cup portion of the foldable table is supported through a telescopic support member to a base plate which is positioned on the car floor. The base plate is anchored in position with suitable weights. A rear tray section is supported above the car seat at a desired heighth through a lateral support member fastened underneath the rear tray section.

8 Claims, 10 Drawing Figures

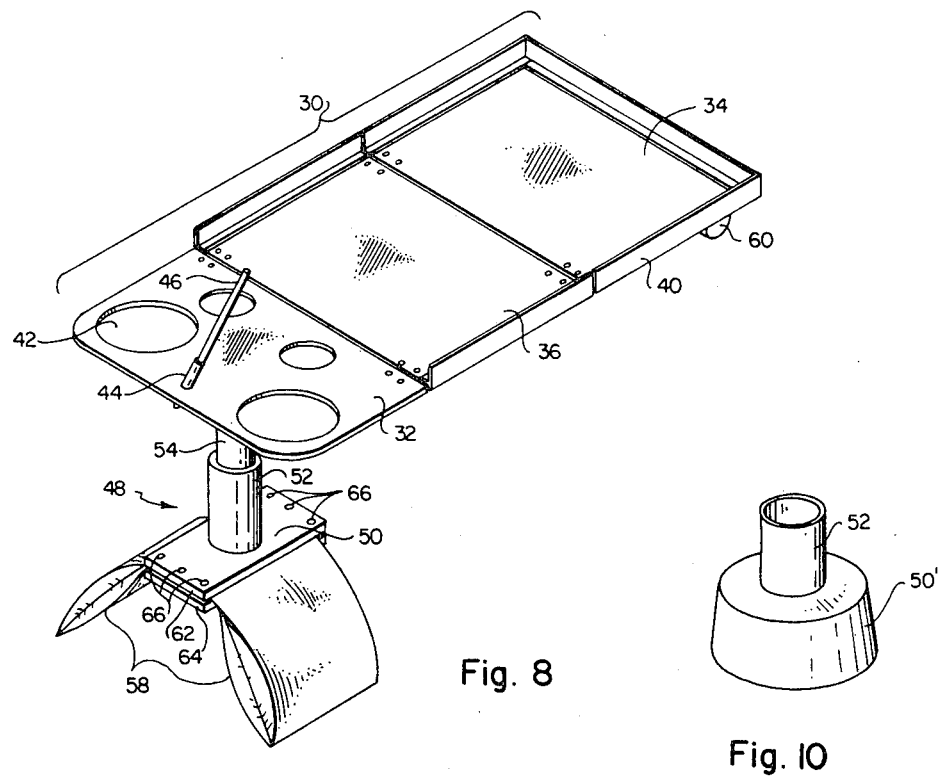
Fig. 8
Fig. 10
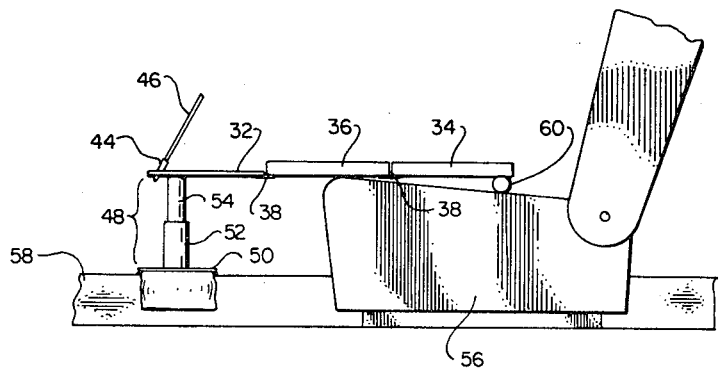
Fig. 9

CAR SEAT TABLES

This application is a continuation-in-part of U.S. application Ser. No. 183,024 filed Sept. 2, 1980 now U.S. Pat. No. 4,341,418.

BACKGROUND OF THE INVENTION

1. Scope of Invention

The present invention relates to car seat tables. One embodiment of the invention is capable of being stored beneath a car seat and then pulled out for use. More specifically, this embodiment relates to a hide-a-way table which is storable under a bench or divided car seat and which is slidable along a track mounted under said seat. Another embodiment is easily removed (and may, accordingly, be transferred between vehicles) and is detachably mounted in its desired position of use and is foldable when stored.

2. Prior Art

Automobiles are used both for short excursions and for longer trips and many people eat while driving in the car. To the driver this may present a problem as he must pay attention to the road and driving conditions as well as trying to eat and drink without spilling on himself. Many cars with bucket seats have trays or shelves positioned between the front bucket seats on which may be placed items of food and drink. However, such trays or shelves are typically permanently installed and may only be removed by undoing screws, bolts, or similar fastening devices. However, for cars with bench car seats, there is no table or tray available and the driver must somehow provide means to prevent his food and drink from spilling while driving.

OBJECTS AND SUMMARY OF THE INVENTION

It is an object of the present invention, in accordance with one embodiment thereof, to provide a food and drink retainer or table which is attachable to and storable under a car seat.

It is another object of the present invention to provide such a table for car seats that is slidable along a track mounted under the car seat.

It is a further object of the present invention to provide such a table for car seats which may be quickly and easily assembled.

It is an additional object of the present invention, in accordance with another embodiment thereof, to provide a foldable car seat table that is supportable, at least in part, from the car floor adjacent to the car seat and that may be readily mounted thereat without the use of screws, bolts, or similar fastening devices.

These and other objects of the invention are realized by a table consisting of multiple folding sections. For the hide-a-way embodiment (storable under the car seat) along the length of the underside of the table is a guide runner which fits over and slides along a track mounted on the bottom of the car seat. The multi-section table is stored under the seat in an upsidedown position when not in use by sliding it along the track. In order to use the table, it is pulled part way from under the seat exposing the first or tray section of the multiple sections. This section is folded upward, it being hinged to the intermediate section. The intermediate section is then slid out along the track. The intermediate section is similarly folded upward due to a hinge between it and the last or support section. The last section is positioned with the runner remaining on the track in order to support the other two sections which have been folded out. The tray section is horizontal and at right angles to the intermediate section and folds back over the seat as a table while the intermediate section is vertical and perpendicularly positioned to the table at the front edge of the car seat. The intermediate section consists of three parts: (1) a vertical riser which connects the tray and support sections; (2) a cup holding section which swings outward and upward away from the vertical riser to be in alignment with the tray section; (3) bracing means which holds up the cup section in position. The last section remains attached to the track but because it is not permanently attached, the entire table unit may be removed to be cleaned or repaired. The preferred embodiment will hereinafter be described in greater detail.

For the removable embodiment (placed in position without fastening devices), a front cup-holding section of the multiple section folding table is supported at the underside thereof with a substantially vertical support member, having a selective height, that rises up from a base plate that rests on the car floor. The base plate includes anchoring means for holding it in a desired position, whether that position be on a floor that is flat or convexly curved, and which anchoring means does not require the use of fastening devices, such as screws or bolts, to secure the base plate to the car floor. A rear tray section of the multiple folding section table is supported at the underside thereof with suitable support structure that elevates the rear section to a desired height. This rear support structure may rest upon the seat, as when a bench seat is employed, or it may rest upon the floor or other items between the seats when bucket seats are employed.

BRIEF DESCRIPTION OF THE DRAWINGS

The above and other objects, features, and advantages of the invention will become more apparent from the following more particular description presented in connection with the accompanying drawings, in which:

FIG. 8 is a pictorial view of a removable embodiment of the car seat table of the present invention in an assembled position;

FIG. 9 is a side view of a car seat table of the type shown in FIG. 8 as used with a bench car seat; and FIG. 10 is a perspective view of an alternate embodiment of a base portion that may be used with the removable embodiment portion of FIG. 8.

DETAILED DESCRIPTION OF THE INVENTION

Inasmuch as there are two embodiments of the present invention, each embodiment will be described separately. However, it is to be understood that there are several features in common with both embodiments, and a description of such a common feature with respect to one embodiment is understood to be applicable with respect to the other embodiment. For example, both embodiments share a multi-section folding table. The materials used to realize the sections of this table, the hinges used to join the sections, the rim around the edges, and the like, are all features that may be shared in common between the two embodiments.

There is shown in FIGS. 1-7 a first embodiment of the invention describing a hide-a-way table and a method of assembly for the same.

Figure 1:
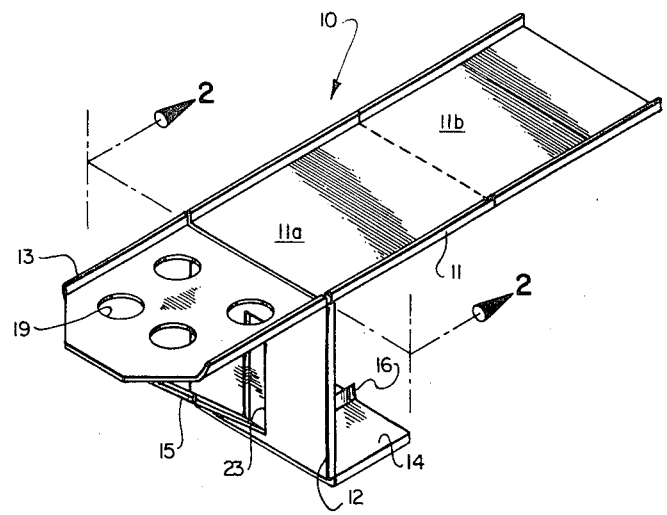
FIG. 1 is a pictorial view of a hide-a-way embodiment of the car seat table of the present invention in an assembled position.
Figure 2:
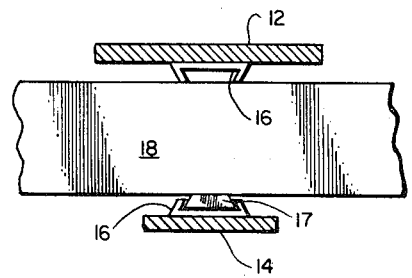
FIG. 2 is a front cross-section view taken along lines 2—2 of FIG. 1 showing one configuration of the track and the guide runner inserted thereon.
Figure 3:
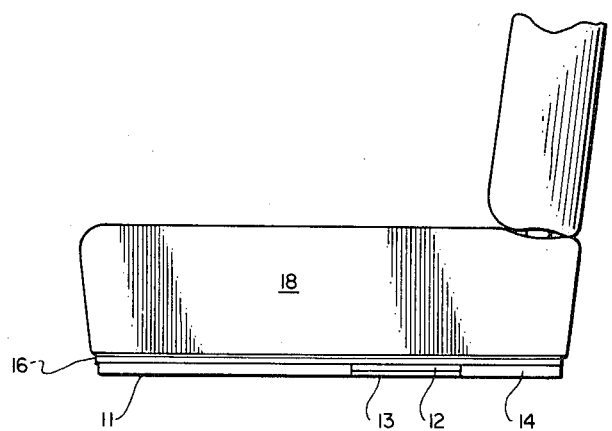
FIG. 3 is a side view of a car seat table of the type shown in FIG. 1 with the car seat table stored underneath in an unassembled position.

FIG. 1 shows a car seat table 10 which consists of a tray section 11, an intermediate section, divided into a riser 12 and a cup section 13, and a support section 14. The riser 12 and cup section 13 sections also contain bracing means 15 to hold the cup section 13 in a horizontal position which is in alignment with the table section 11 and perpendicular to the riser 12 when the table is in an assembled position. Each of the various sections are connected to an adjacent section by hinge means. Each of the sections, with the exception of the cup portion 13 of the intermediate section contain a guide runner 16 on the underside thereof, which is shaped to mate with a track 17 mounted on the bottom of a car seat 18 a spaced distance above the floor.

This embodiment of the invention is preferably utilized in cars having bench seats and is attached under the portion of the seat just above the hump in the floor which accommodates the transmission and drive train. There must be sufficient clearance between the bottom of the seat and the floor to accommodate the track and table. The table may also be utilized on either side of a divided bench seat which can accommodate the width of the table and leave sufficient room for the driver or passenger to be seated. The table could also be assembled under a bucket seat on the passenger side and be assembled for the benefit of a driver when the front passenger seat was not occupied.

Because the tray section 11 has greater length than the other sections, it may be necessary to divide it into two or more sections 11a, 11b, etc. hinged to each other in order to be able to pull that section out from under the car seat. This is especially the case in automobiles having a standard transmission where the shifting lever is located on the floor just in front of the seat.

The tray section 11 preferably has a rim around the outer perimeter to prevent spillage onto the car seat. The cup section 13 contains one or more holes 19 sized to hold beverage containers and keep them from spilling.

The table as illustrated in the drawings consists of three sections as described with the division of the table section 11 into sections 11a and 11b being shown by a dotted line.

Figure 7:
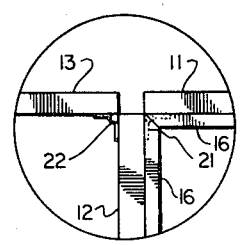
FIG. 7 is an enlarged view of the double hinged juncture of the riser with the cup portion and the tray section as shown in FIG. 6.

The unit is installed in an automobile by securing a track 17 to the bottom structure of a car seat 18 in an area convenient to the driver where there is sufficient clearance under the seat for storage of the table. The guide runner 16 is in sections and is centrally secured to the appropriate table sections so that the various runner sections are in alignment but do not inhibit the folding of the various table sections to a position where the surfaces containing the runners are at 90° angles to each other. If the guide runners are cut at 45° angles as shown in FIG. 7 the angled surfaces meet and support adjacent table sections when at right angles to each other.

The support section 14 is connected to the riser 12 by means of one or more hinges 20. A single piano hinge could be used or two or more cabinet or strap hinges may also be employed. Similarly, the riser 12 is connected at the opposite end to the tray section 11 by the same type of hinges 21. The cup section 13 is also attached to the riser 12 at the same end as the table section 11 by hinge means 22 located on the riser 12 surface opposite the surface containing hinge means 21 as shown in FIG. 7.

The table 10 is stored in an upsidedown position with the various portion to the running guide 16 being mounted on the track 17 under the seat 18.

Figure 4:
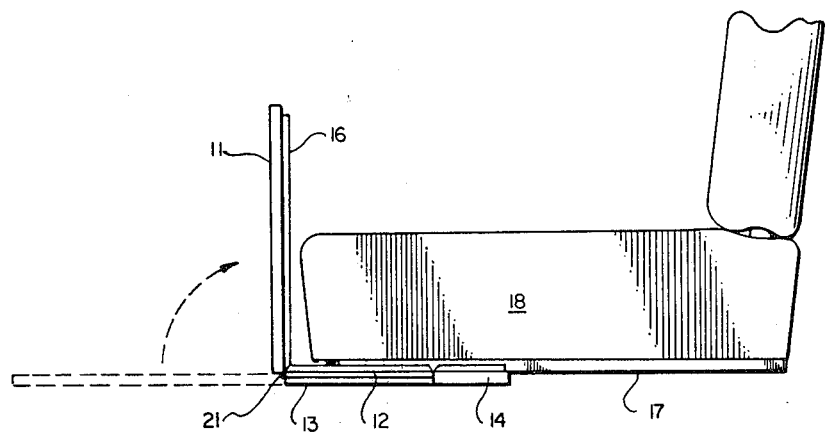
FIG. 4 is a side view as in FIG. 3 with the car seat table in a first stage of assembly.

The table is assembled by sliding the table 10 along the track 17 out from under the seat 18 until the tray section 11 is clear of the track and front edge of the car seat as shown in FIG. 4. This section is folded upwardly and the next section is pulled out. If the tray section is divided into two or more sections, the procedure is repeated as many times as necessary so that the entire tray section is removed from under the seat. If necessary, the various tray sections may be inflexibly secured to each other by sliding bolts and the like.

Figure 5:
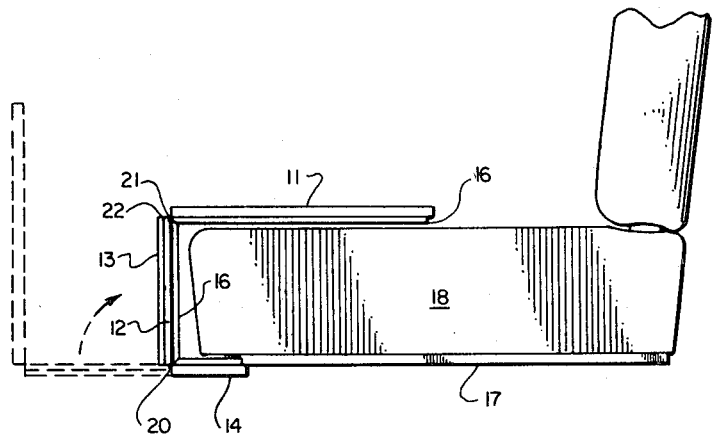
FIG. 5 is a side view as in FIG. 4 with the car seat table in a second state of assembly.
Figure 6:
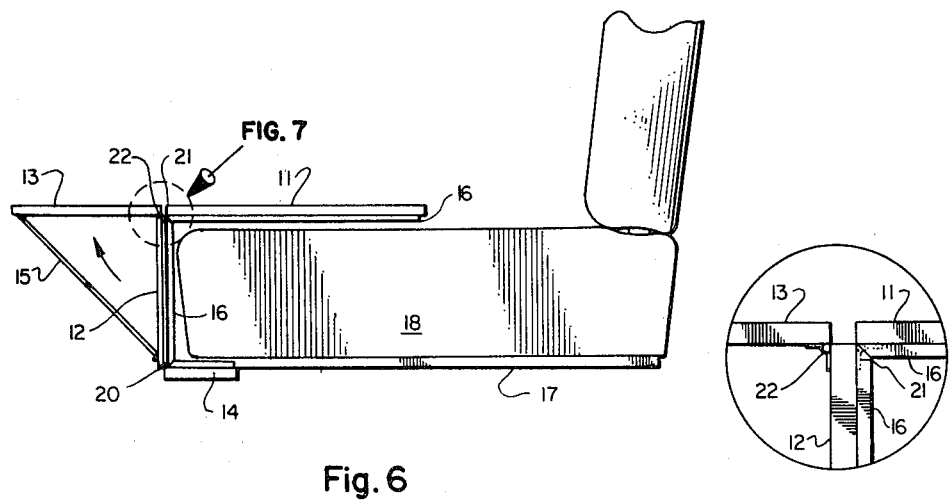
FIG. 6 is a side view as in FIG. 5 with the car seat table completely assembled.

Once the tray section has been removed from under the seat and folded to a vertical position, the intermediate section consisting of the riser 12 and cup portion 13 is slid out from the track and folded to a vertical position as shown in FIG. 5. The tray section 11 thus assumes a horizontal position extending back over the top of the seat and resting on the front edge of the seat surface as shown in FIG. 5. Support section 14 remains slidably secured to track 17 to hold the table in position. With the table in this stage of assembly, the cup portion 13 is swung outwardly and upwardly away from the riser 12 about hinge 22 to lie in the same horizontal plane as the tray section 11 and is locked in place by bracing means 15 as shown in FIG. 6.

Various types of bracing means may be utilized. A foldable, locking brace hinged at either end is shown in FIG. 6. Such a brace will fold as the cup section 13 is lowered and may fit into a recess in riser 12 when the cup section 13 rests against the riser. An adjustable fold-down brace which folds down from the end of the cup section and rests on the car floor in a vertical position is one alternative. A second alternative is a rigid rod the ends of which fit into notches located in the underside of the cup section and along the outer surface of the riser.

If desired, the support section may also be slid away from the track and the car seat table completely removed from the car.

Preferably, the table 10 is constructed of durable plastic or wood having a metal, teflon or nylon runner 16 and track 17. The runners are preferably constructed such that at each hinged section they are cut at a 45° angle so that they rest against one another as shown in FIG. 7.

If desired, it is possible to vary the width of tray section 11 and cup section 13 by the use of hinged wings laterally located on the sides of these sections which fold outwardly and lock into position once the table is assembled. The table may run along parallel tracks instead of a single track.

There is shown in FIGS. 8–10 a second embodiment of the present invention describing a removable car seat table that may be readily mounted in a desired position without the use of screws, bolts, or similar fastening devices. In this embodiment, a multi-section table 30 includes a front cup-holding section 32, a rear tray section 34, and an intermediate tray section 36. The intermediate tray section 36 is hinged to the cup-holding section 32 along one edge and the rear tray section 34 along the other edge. Conventional hinge 38 may be used for this purpose. A suitable rim 40 surrounds the outer perimeter of the tray sections 34 and 36 to prevent spillage onto the car seat. The cup-holding section 32 has one or more holes 42 sized to hold beverage containers and the like and to keep them from spilling. This section also includes a pen/pencil holder 44 for holding a pen or pencil 46 in an erected position where it may be readily accessible.

The cup-holding section 32 of the multi-section table unit 30 is supported on the underside thereof with support member 48. One end of support member 48 attaches to a base plate 50 or 50', while the other end is attached to the underside of the cup-holding table section 32. In a preferred embodiment, the support member 48 is adjustable in height, there being a first member 52 attached to the base plate 50 or 50' inside of which a second member 54 may be telescopingly inserted. Locking means may be provided in order to hold the upper support member 54 at a desired height with respect to the lower support member 52 once the desired height has been obtained. Alternatively, if the removable car seat table shown in FIGS. 8–10 is to be used in only one vehicle, the upper support member 54 may be cut to a desired heighth compatible with a car seat 56 so that the lower end of the member 54 bottoms out within the support member 52 at the desired height.

The base plate may take one of two forms. In a first form, shown as 50 in FIGS. 8 and 9, anchor bags 58 are attached to opposing sides thereof. These anchor bags 58 are filled with a suitable dense, pliable substance, preferably of a granular type. For example, a suitable substance with which to fill the anchor bags 58 is sand. In a second form, shown as 50' in FIG. 10, the base plate comprises a weighted, substantially cylindrical member having a flat bottom and a diameter substantially larger than the diameter of the first support member 52. As such, the base plate 50' takes on the appearance of an inverted bowl with a hollow post (the support member 52) protruding out from the center thereof.

The first form of base plate 50 is adapted for use primarily with cars having a raised hump 58 passing longitudinally through the center thereof (as many cars do in order for the transmission and/or drive train to pass underneath the car). In such an application, the anchor bags 58 straddle the hump 58 and still allow the base 50 to be held in a desired substantially level position. If such a hump 58 is not present, then the second form of base plate 50' may be used and merely rest on the flat floor of the car immediately in front of the car seat 56, although the base plate 50 of the first form could also merely rest on the flat floor. In this respect, it is significant to note that flat floors are becoming more and more prevalent as front-drive vehicles become more common. Also, the car seat tables herein disclosed may be used with a rear or middle car seat as well as the front car seat, and such rear or middle seats may have either a flat or humped floor.

A rear support member 60 is affixed to the underneath side of the rear tray section 34. Preferably, this support member 60 is a cylindrical tube that is affixed tangentually to the underside of the rear tray section 34. The diameter or width of the support member 60 is selected so that the table section 30 is substantially level when the intermediate tray section 36 rests on the tip or front of the seat 56. If desired, a suitable adjustment could be included with this tubular support member 60 so as to provide some adjustment to the elevated position of the rear trays section 34.

As best seen in FIG. 8, the first form of base plate 50 may be readily realized using two pieces of flat material 62 and 64. These materials 62 and 64 may be realized using plastic, masonite, wood, metal, or any other suitable material. The open ends of the anchor bags 58, which bags may be realized from any suitable fabric material, may be sandwiched in between the two plates 62 and 64. The plates 62 and 64 are then secured one to the other by any suitable means, such as with rivets 66, and the anchor bags 58 are thus permanently closed.

The second form of base plate 50' may be realized using any suitable hollow container or mold, preferably made from inexpensive plastic, that is filled with a dense substance.

The support members 52 and 54, as well as the rear support tube 60, may advantageously be realized using commercially available PVC plastic pipe or the equivalent. Such pipe is readily available in convenient sizes and is inexpensive. Moreover, if a 1½" PVC pipe is used to realize the support member 52, then a 1¼" PVC pipe may be used for the support member 54 and such support member will just fit inside of the 1½" pipe 52, thereby providing the desired telescopic adjustment.

While the invention herein disclosed has been described by means of specific embodiments and applications thereof, numerous modifications and variations could be made thereto by those skilled in the art without departing from the spirit and scope of the present invention. It is therefore to be understood that within the scope of the appended claims, the invention may be practiced otherwise than as specifically described herein.

I claim:
1. A foldable car seat table assembly comprising
a front support section, including
  (a) a base portion,
  (b) anchoring means for frictionally holding said base portion against a floor forward of a car seat, and
  (c) a first support member perpendicularly attached to said base portion, whereby said first support member protrudes up in front of said seat in a substantially vertical orientation whenever said base portion is frictionally held against the floor of said car by said anchoring means; and
a table unit having a plurality of sections, each section of which is foldable with respect to an adjacent section and is attached to an adjacent section by hinge means, with each section being in the same plane when unfolded, said sections of said table unit including:
  (a) a front cup section having a plurality of apertures therein for receiving cups and the like, and

(b) a rear tray section having support means along an underneath back edge thereof for supporting said tray section in an elevated position; and a second support member perpendicularly attached to an underneath side of said front cup section, said second support member being adapted to be adjustably and detachably secured to said first support member.

2. A foldable car seat table as defined in claim 1 wherein said first support member comprises a first rigid tube and said second support member comprises a second rigid tube adapted to be telescopingly inserted into said first rigid tube.

3. A foldable car seat table as defined in claim 2 wherein said base portion is a planar member and said anchoring means comprises a pair of flexible bags filled with a dense pliable substance, one bag of said pair of bags being attached to a respective side of said planar base portion, whereby said planar base portion may be placed at a desired location on the car floor, including a floor location that is on top of a curved surface, such as the drive-shaft hub that is present in many car floors, and the weight of said bags, which bags extend outwardly from respective sides of the planar base, anchors said planar base portion in its desired position against the car floor.

4. A foldable car seat table as defined in claim 3 wherein said dense pliable substance is a granular material, such as sand.

5. A foldable car seat table as defined in claim 2 wherein said table unit further includes an intermediate tray section that is foldably attached through hinge means to respective edges of said front cup section and said rear tray section.

6. A foldable car seat table as defined in claim 5 further including a rim around the outer perimeter of said intermediate and rear tray sections.

7. A foldable car seat table as defined in claim 2 wherein said front cup section of said table unit further includes means for detachably holding a writing implement, such as a pen or pencil, in a protruding position, whereby the writing implement may be readily located and removed when desired.

8. A foldable car seat table as defined in claim 2 wherein said base portion is a non-planar member having a flat bottom and having horizontal dimensions substantially larger than the horizontal dimensions of said first support member, and further wherein said anchoring means includes a dense substance placed inside of said non-planar member.

* * * * *